US012647371B2

(12) United States Patent
Aregala

(10) Patent No.: US 12,647,371 B2
(45) Date of Patent: Jun. 2, 2026

(54) METHOD, APPARATUS, AND COMPUTER READABLE MEDIA FOR DYNAMICALLY UPDATING A RETRANSMISSION TIMEOUT PERIOD

(71) Applicant: AMADEUS S.A.S., Biot (FR)

(72) Inventor: Bhavani Aregala, Bengaluru (IN)

(73) Assignee: AMADEUS S.A.S., Biot (FR)

( * ) Notice: Subject to any disclaimer, the term of this patent is extended or adjusted under 35 U.S.C. 154(b) by 253 days.

(21) Appl. No.: 18/364,163

(22) Filed: Aug. 2, 2023

(65) Prior Publication Data

US 2024/0113982 A1      Apr. 4, 2024

(30) Foreign Application Priority Data

Sep. 23, 2022      (IN) .............................. 202241054563

(51) Int. Cl.
*H04L 47/24*          (2022.01)
*H04L 43/0864*          (2022.01)
*H04L 47/11*          (2022.01)
*H04L 47/283*          (2022.01)

(52) U.S. Cl.
CPC ........ *H04L 47/283* (2013.01); *H04L 43/0864* (2013.01); *H04L 47/11* (2013.01)

(58) Field of Classification Search
CPC ... H04L 1/1887; H04L 43/0864; H04L 47/11; H04L 47/283
See application file for complete search history.

(56) References Cited

U.S. PATENT DOCUMENTS

| | | | | |
|---|---|---|---|---|
| 6,311,186 B1 * | 10/2001 | MeLampy | ........... | H04Q 3/0029 |
| | | | | 707/999.005 |
| 7,180,871 B1 * | 2/2007 | Khaflzov | ............ | H04L 43/0864 |
| | | | | 370/252 |
| 7,911,949 B2 | 3/2011 | Ho | | |
| 10,616,947 B1 * | 4/2020 | Choi | ..................... | H04W 24/02 |
| 2006/0234644 A1 * | 10/2006 | Ludwig | ................... | H04L 1/188 |
| | | | | 714/748 |
| 2009/0245105 A1 * | 10/2009 | Ho | ........................ | H04L 47/283 |
| | | | | 370/231 |
| 2016/0094462 A1 * | 3/2016 | Heitz | .................... | H04W 80/06 |
| | | | | 370/231 |

FOREIGN PATENT DOCUMENTS

| | | |
|---|---|---|
| CN | 108880763 A | 11/2018 |
| CN | 111245578 A | 6/2020 |

* cited by examiner

*Primary Examiner* — Phuc H Tran
(74) *Attorney, Agent, or Firm* — Perry + Currier Inc.

(57) ABSTRACT

The present disclosure describes method, apparatus, and computer readable media for dynamically updating a retransmission timeout (RTO) period for data transmissions in a communication system. In an aspect, the method comprises a first step of computing a round-trip time (RTT) period for a successful data transmission between a client and a server in the communication system. The method also comprises a second step of updating the RTO period after the successful data transmission based at least on the computed RTT period. Finally, the method comprises repeating the first and second steps after every $M^{th}$ successful data transmission, wherein M is an integer with a value greater than 1.

17 Claims, 7 Drawing Sheets

700

Figure 1:
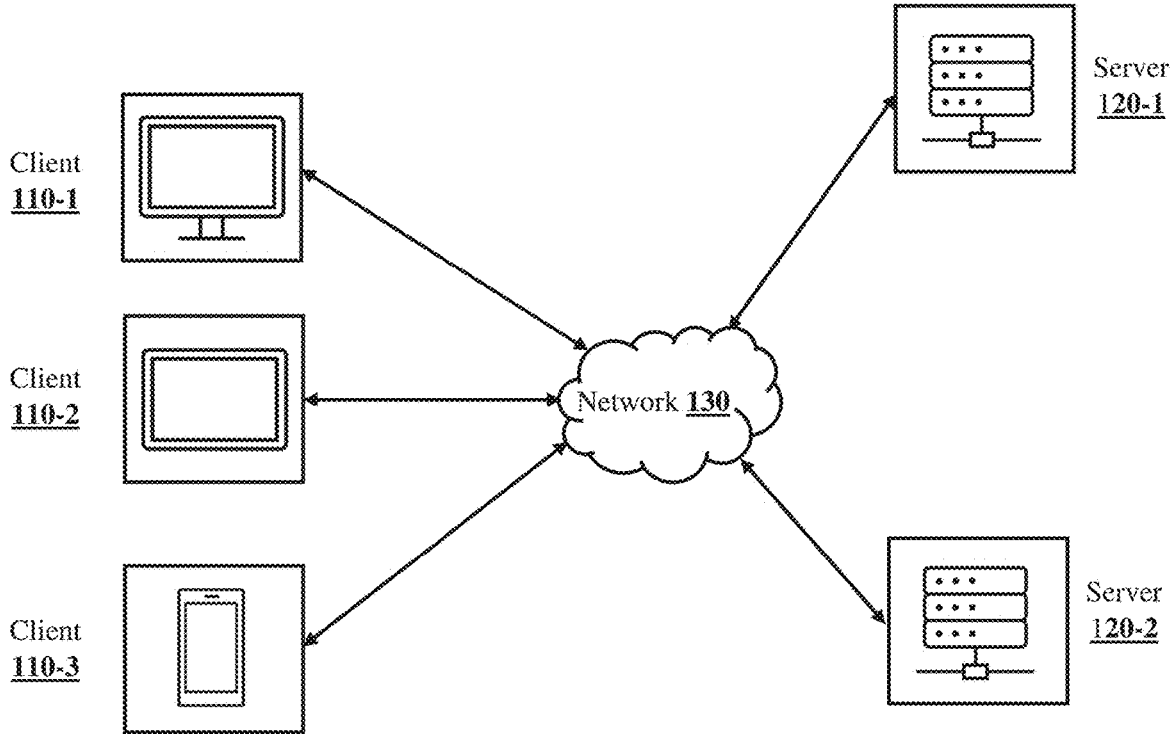

(a)  Compute a RTT period for a successful data transmission between a
client and a server in a communication system
⟶ 702

(b)  Update an RTO period after the successful data transmission based at
least on the computed RTT period
⟶ 704

Repeat steps (a) and (b) after every $M^{th}$ successful data transmission, where M
is an integer with a value greater than 1
⟶ 706

100

200

700

(a)    Compute a RTT period for a successful data transmission between a
client and a server in a communication system                                702

(b)    Update an RTO period after the successful data transmission based at
least on the computed RTT period                                              704

Repeat steps (a) and (b) after every M[th] successful data transmission, where M
is an integer with a value greater than 1                                     706

METHOD, APPARATUS, AND COMPUTER READABLE MEDIA FOR DYNAMICALLY UPDATING A RETRANSMISSION TIMEOUT PERIOD

CROSS-REFERENCE TO RELATED APPLICATION

This application claims priority from Indian patent application no. 202241054563, filed Sep. 23, 2022, the contents of which is incorporated herein by reference.

TECHNICAL FIELD

The present disclosure in general relates to data transmissions in a communication system. More particularly, but not exclusively, the present disclosure relates to method, apparatus, and computer readable media for dynamically updating a retransmission timeout (RTO) period for data transmissions in a communication system.

BACKGROUND

Generally, in the field of communication, packet switching is widely used for data transmissions among different network devices in a communication system. In a packet switched network, data to be transmitted is first divided into small data packets and then the small data packets are transmitted over a network in accordance with a communication protocol. In order to ensure reliable transmission of the data packets in packet switched networks, many protocols provide the feature of data retransmission. Generally, data retransmission refers to resending or retransmitting data packets which are either lost or damaged. An example of a protocol that provides the feature of data retransmission in the packet switched networks is Transmission Control Protocol (TCP). TCP is a connection-oriented protocol and is a part of Transmission Control Protocol/Internet Protocol (TCP/IP) protocol suite used to interconnect network devices on Internet.

In a communication system, where data is transmitted using TCP, a transmitting network device (also referred to as a "client" or a "client device") may transmit a data packet to a receiving network device (also referred to as a "server" or a "server device") using TCP as the communication protocol. Upon receiving the data packet from the client, the server may transmit a response/acknowledgment (ACK) to the client corresponding to the received data packet. The time period within which the client transmits the data packet to the server and receives the ACK corresponding to the transmitted data packet from the server is called "round trip time (RTT)" period. If the client does not receive the ACK for a certain time period after transmitting the data packet, the client assumes that the data packet is either lost or damaged and may retransmit the same data packet to the server. The time period between transmission and re-transmission of the same data packet to the server is also called a "retransmission timeout (RTO)" period.

In some conventional communication systems employing TCP for data transmissions, the value of RTO period for data transmissions between the client and the server is fixed. However, if the fixed value of the RTO period is set low, then the RTO period may expire quickly even before receiving the ACK from the server and the client may retransmit a data packet even if the data packet is actually not lost/damaged. Such retransmissions of data packets may cause wastage of network resources and congestion in the network because if the client had waited somewhat longer, it would have received the acknowledgement from the server and there would have been no need of retransmission of the data packet. Sometimes even the server may not be ready to accept such quick retransmissions, thereby resulting in loss of data packets and further deteriorating the network conditions. Also, if the fixed value of the RTO period is set high, then there may be excessive delay in retransmission of a data packet even when the data packet is actually lost, which may also cause degradation in quality of service.

Hence, instead of using fixed RTO period for the data transmissions between the client and the server, there exists a need to implement dynamic RTO for the data transmissions to avoid degradation in quality of service and/or wastage of network resources. In view of the foregoing, there exists a need to provide a solution which overcomes at least the above-mentioned technical challenges. Particularly, there exists a need for techniques for dynamically updating the RTO period for data transmissions in a communication system.

The information disclosed in this background section is only for enhancement of understanding of the general background of the invention and should not be taken as an acknowledgement or any form of suggestion that this information forms the prior art already known to a person skilled in the art.

SUMMARY

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

The present disclosure relates to techniques for dynamically updating retransmission timeout (RTO) period for data transmissions in a communication system.

In one non-limiting embodiment, the present disclosure discloses a method of dynamically updating a retransmission timeout (RTO) period for data transmissions in a communication system. The method comprises a step (a) of computing a round-trip time (RTT) period for a successful data transmission between a client and a server in the communication system. The method further comprises a step (b) of updating the RTO period after the successful data transmission based at least on the computed RTT period. The method further comprises a step (c) of repeating the steps (a) and (b) after every $M^{th}$ successful data transmission, where M is an integer with a value greater than 1.

Advantageously, updating the RTO period after every $M^{th}$ (M>1) successful data transmission reduces RTO computation load on the client thereby saving computing resources of the client and increasing the performance of the client.

In one non-limiting, embodiment of the present disclosure, the method may further comprise setting a value of M to a fixed value.

In one non-limiting embodiment of the present disclosure, the method may further comprise determining a range of values for M based on a current network traffic and at different intervals, selecting a value of M from the range of values for M.

In one non-limiting embodiment of the present disclosure, the method may further comprise updating the range of values for M upon detecting a change in the current network traffic; and at different intervals, selecting a value of M from the updated range of values for M.

In one non-limiting embodiment of the present disclosure, the method may further comprise setting a value as a lowest value of M from a range of values for M; and at regular intervals, incrementing the value of M starting from the lowest value within the range of values for M.

In one non-limiting embodiment of the present disclosure, the method may further comprise setting a value as a highest value of M from a range of values for M; and at regular intervals, decrementing the value of M starting from the highest value within the range of values for M.

In one non-limiting embodiment of the present disclosure, the method may further comprise setting a value as a lowest value of M from a range of values for M; at regular intervals, incrementing the value of M starting from the lowest value within the range of values for M; and upon detecting that the value of M has reached a particular value within the range of values for M, decrementing the value of M at regular intervals starting from the particular value.

In one non-limiting embodiment of the present disclosure, the step of updating the RTO period after the successful data transmission based at least on the computed RTT period may comprise computing the RTO period after the successful data transmission using:

$$RTO_n = \frac{[(RTO_{n-1}) * (n-1)] + RTT_n}{n}$$

where,
   n is a sequence number of the successful data transmission, $RTO_n$ is the RTO period after the successful data transmission. $RTO_{n-1}$ is an immediate previous RTO period, and $RTT_n$ is the RTT period for the successful data transmission.

In one non-limiting embodiment of the present disclosure, the method may further comprise continue updating the RTO period after every $M^{th}$ successful data transmission until the RTO period falls within a defined range, wherein the defined range is dynamically updated.

In another non-limiting embodiment, the present disclosure discloses an apparatus for dynamically updating a retransmission timeout (RTO) period for data transmissions in a communication system. The apparatus may comprise a memory and at least one processor communicatively coupled with the memory. The processor may be configured to (a) compute a round-trip time (RTT) period for a successful data transmission between a client and a server in the communication system; and (h) update the RTO period after the successful data transmission based at least on the computed RTT period. The processor may be further configured to repeat the steps (a) and (b) after every $M^{th}$ successful data transmission, wherein M is an integer with a value greater than 1.

In one non-limiting embodiment of the present disclosure, the processor may be further configured to set a value of M to a fixed value.

In one non-limiting embodiment of the present disclosure, the processor may be further configured to determine a range of values for M based on a current network traffic and at different intervals, select a value of M from the range of values for M.

In one non-limiting embodiment of the present disclosure, the processor may be further configured to update the range of values for M upon detecting a change in the current network traffic; and at different intervals, select a value of M from the updated range of values for M.

In one non-limiting embodiment of the present disclosure, the processor may be further configured to set a value as a lowest value of M from a range of values for M; and at regular intervals, increment the value of M starting from the lowest value within the range of values for M.

In one non-limiting embodiment of the present disclosure, the processor may be further configured to set a value as a highest value of M from a range of values for M; and at regular intervals, decrement the value of M starting from the highest value within the range of values for M.

In one non-limiting embodiment of the present disclosure, the processor may be further configured to set a value as a lowest value of M from a range of values for M; at regular intervals, increment the value of M starting from the lowest value within the range of values for M; and upon detecting that the value of M has reached a particular value within the range of values for M, decrement the value of M at regular intervals starting from the particular value.

In one non-limiting embodiment of the present disclosure, to update the RTO period after the successful data transmission based at least on the computed RTT period, the processor may be configured to compute the RTO period after the successful data transmission using:

$$RTO_n = \frac{[(RTO_{n-1}) * (n-1)] + RTT_n}{n}$$

where,
   n is a sequence number of the successful data transmission, $RTO_n$ is the RTO period after the successful data transmission, $RTO_{n-1}$ is an immediate previous RTO period, and $RTT_n$ is the RTT period for the successful data transmission.

In one non-limiting embodiment of the present disclosure, the processor may be further configured to continue updating the RTO period after every $M^{th}$ successful data transmission until the RTO period falls within a defined range, wherein the defined range is dynamically updated.

In yet another non-limiting embodiment, the present disclosure discloses a non-transitory computer readable media comprising one or more instructions which, when executed by at least one processor of an apparatus, cause the apparatus to perform the method according to any one of the above-described method embodiments. Specifically, the one or more instructions may comprise one or more instructions for (a) computing a round-trip time (RTT) period for a successful data transmission between a client and a server in the communication system; and one or more instructions for (b) update the RTO period after the successful data transmission based at least on the computed RTT period. The one or more instructions may further comprise one or more instructions for repeating the steps (a) and (b) after every $M^{th}$ successful data transmission, wherein M is an integer with a value greater than 1.

Particular advantages provided by some of the disclosed embodiments include reducing the load of RTO calculation on the client, thereby saving computing resources of the client and increasing the performance of the client (and of the communication system, more generally). Further, techniques of the present disclosure provide a more accurate and optimal estimate of the RTO period by calculating the RTO period based on instantaneous RTT period while dynamically changing the value of M. The optimal and accurate RTO period guarantees delivery of a data packet even if the data packet is lost or damaged, thereby providing reliable communication between the client and the server. Hence, the techniques of the present disclosure provide efficient data transmission in a client-server architecture.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying Figures, in which:

FIG. 1 shows a communication system 100 in which the techniques of dynamically updating a retransmission timeout (RTO) period may be implemented, in accordance with some embodiments of the present disclosure.

Figure 2:
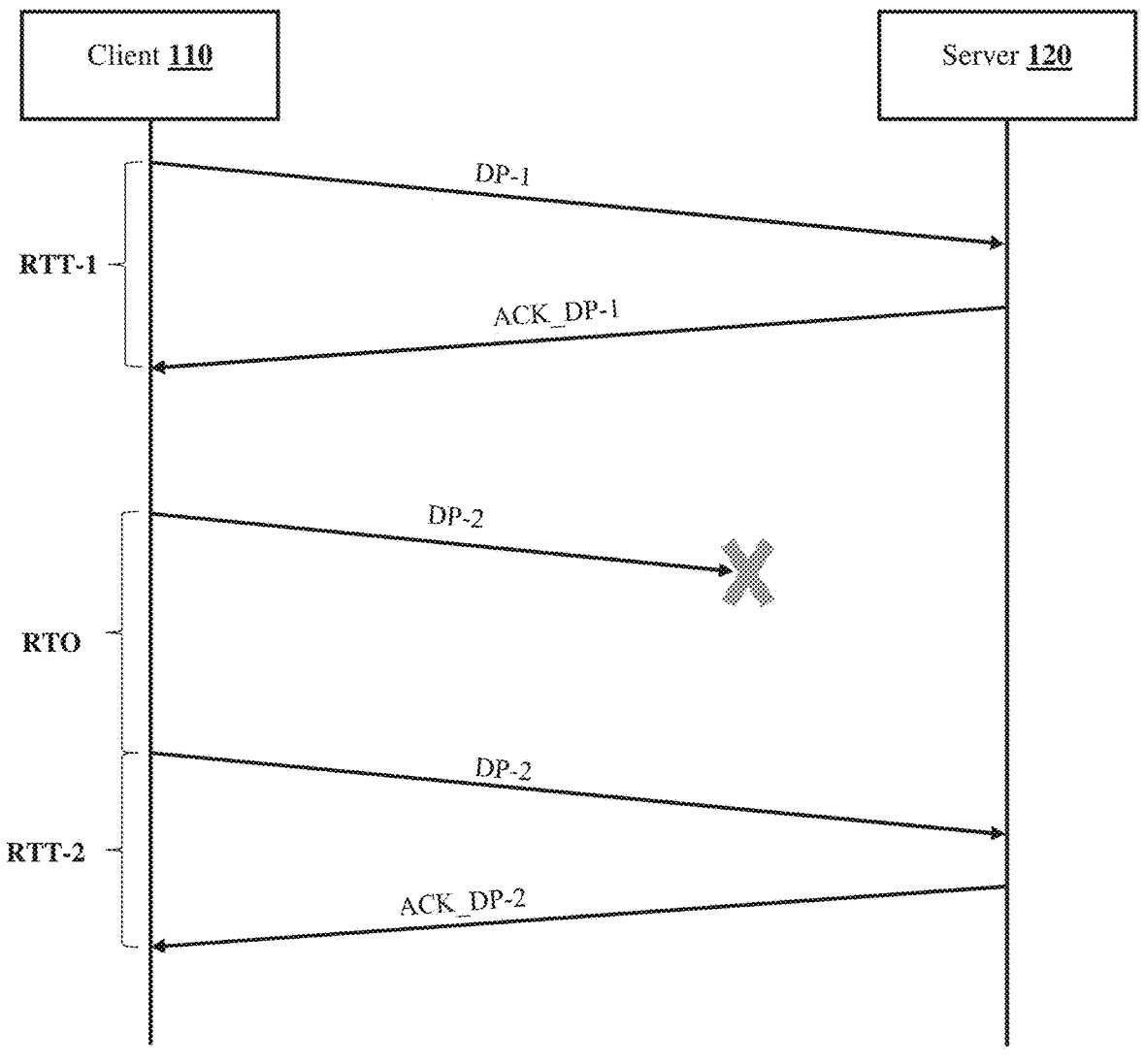

FIG. 2 shows an exemplary time chart 200 showing transmission of data between a client 110 and a server 120.

Figure 3:
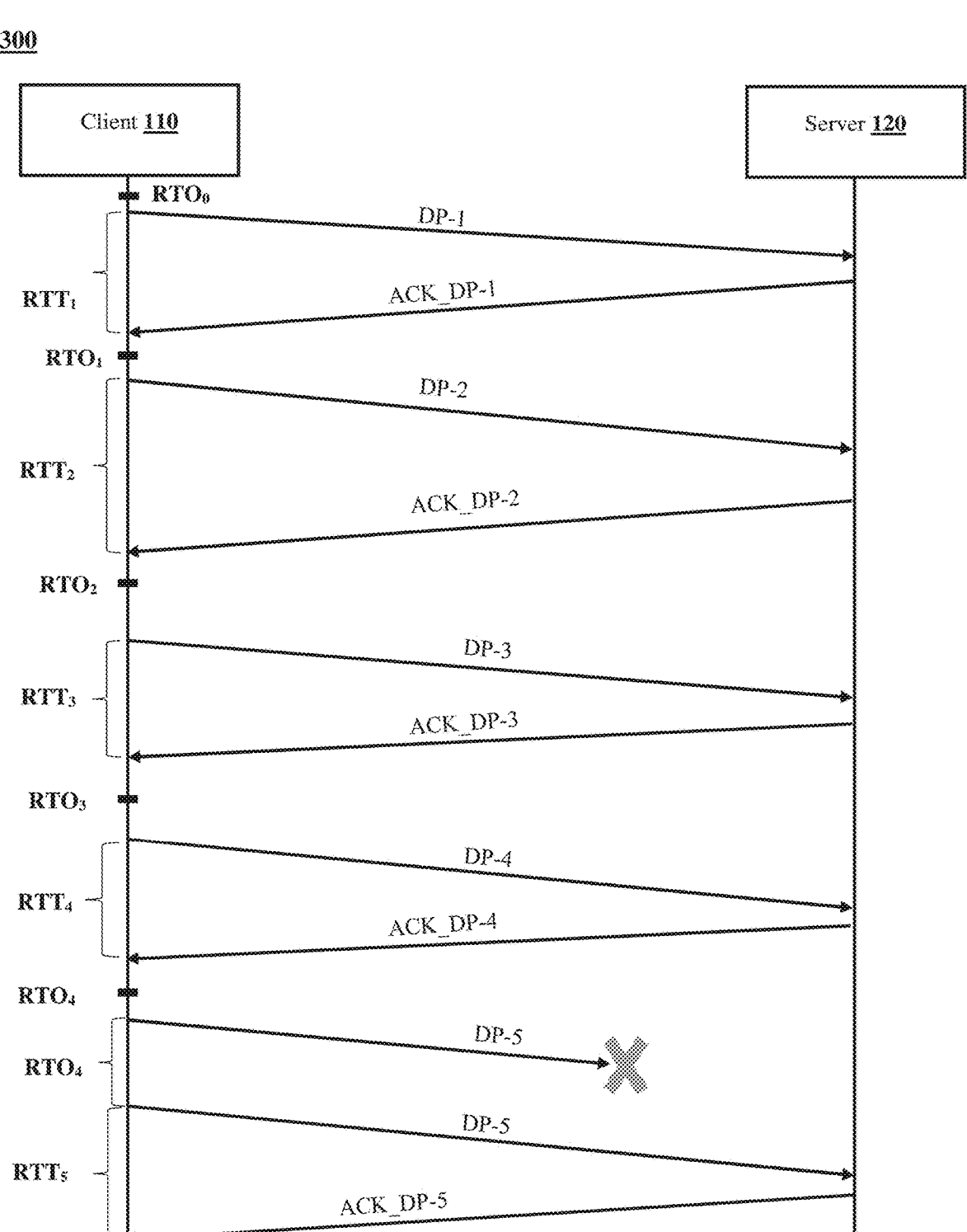

FIG. 3 shows an exemplary time chart 300 illustrating dynamically updating the RTO period for data transmissions between the client 110 and the server 120, in accordance with some embodiments of the present disclosure.

Figure 4:
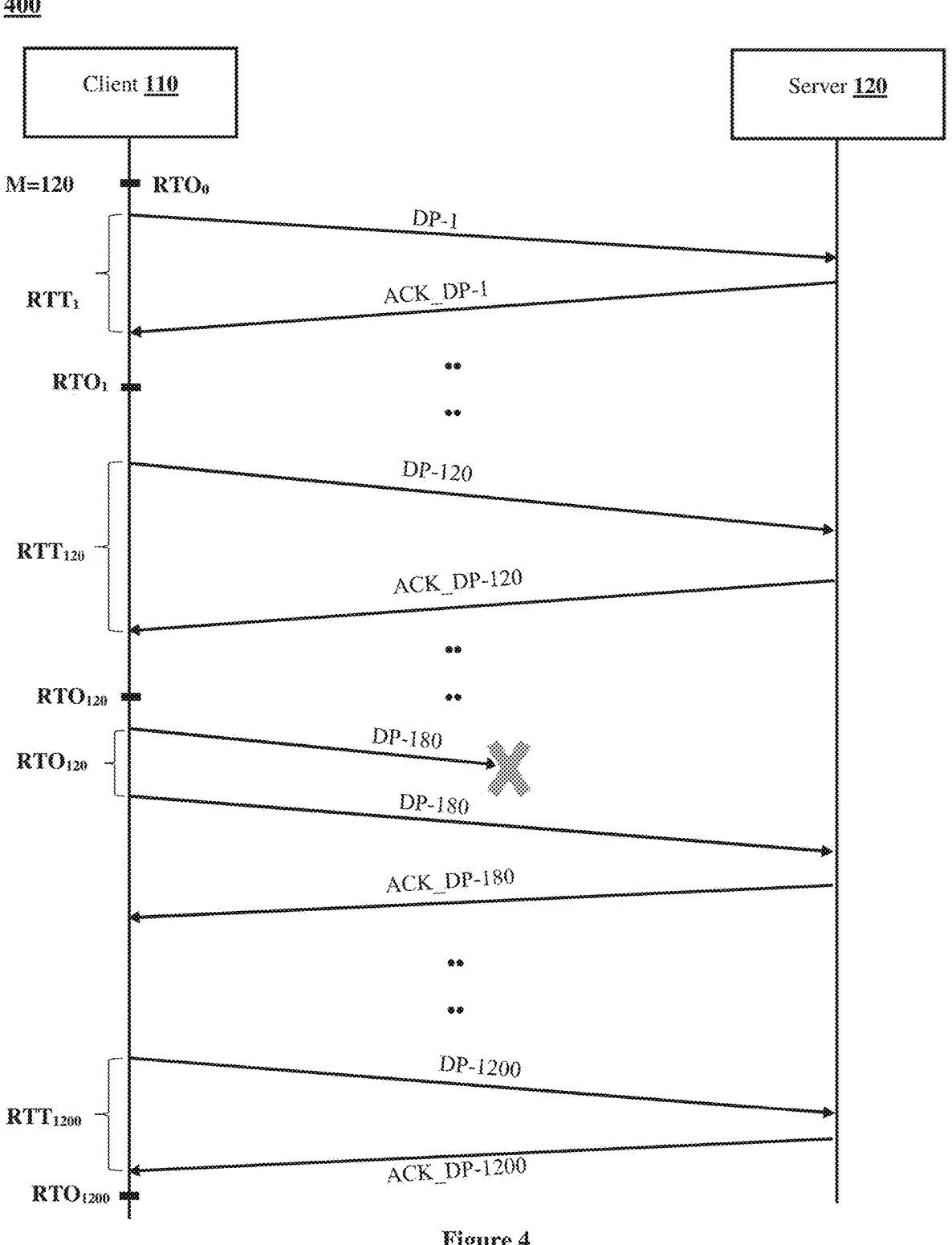

FIG. 4 shows another exemplary time chart 400 illustrating dynamically updating the RTO period for data transmissions between the client 110 and the server 120, in accordance with some embodiments of the present disclosure.

Figure 5:
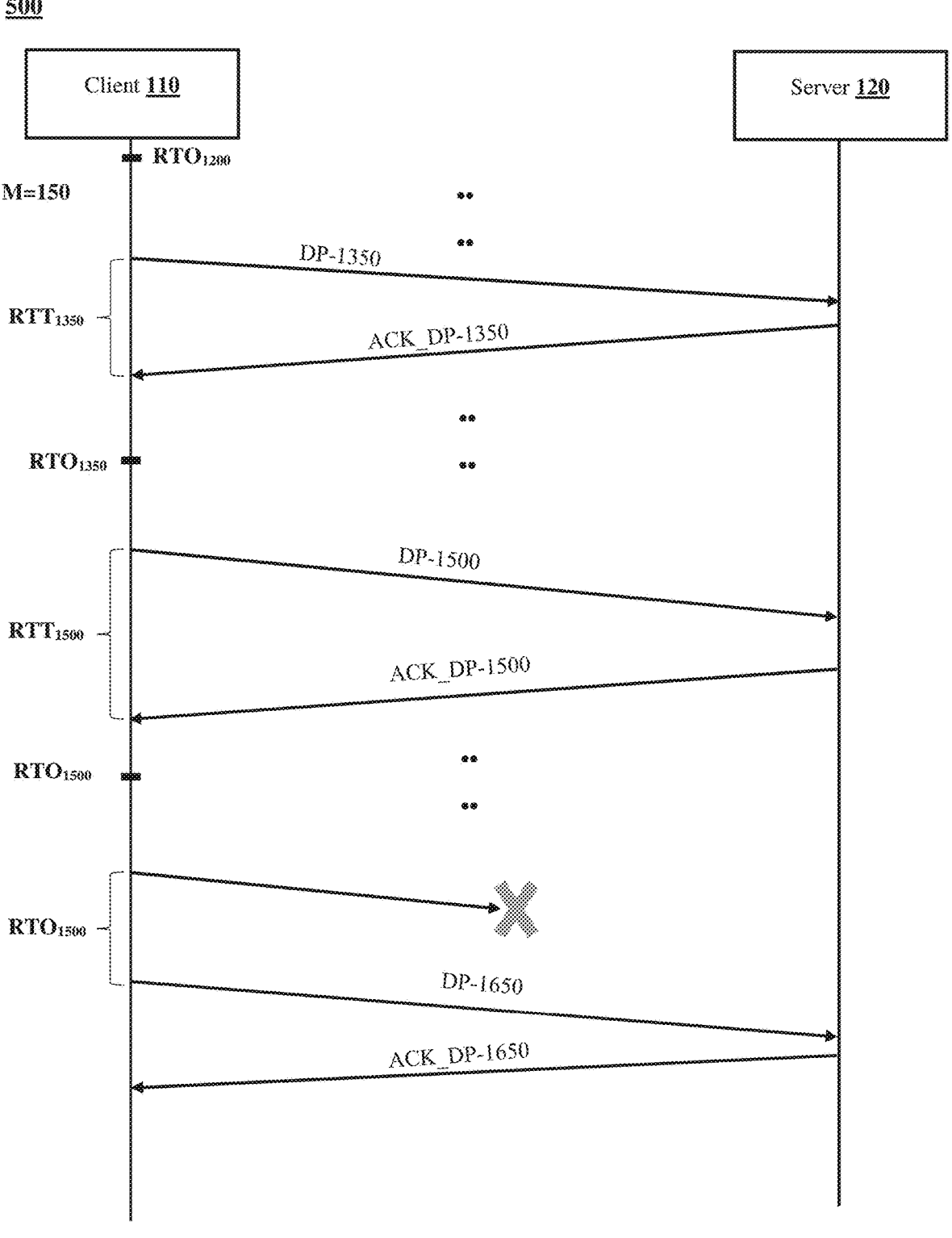

FIG. 5 shows another exemplary time chart 500 illustrating dynamically updating the RTO period for data transmissions between the client 110 and the server 120, in accordance with some embodiments of the present disclosure.

Figure 6:
Figure 6:
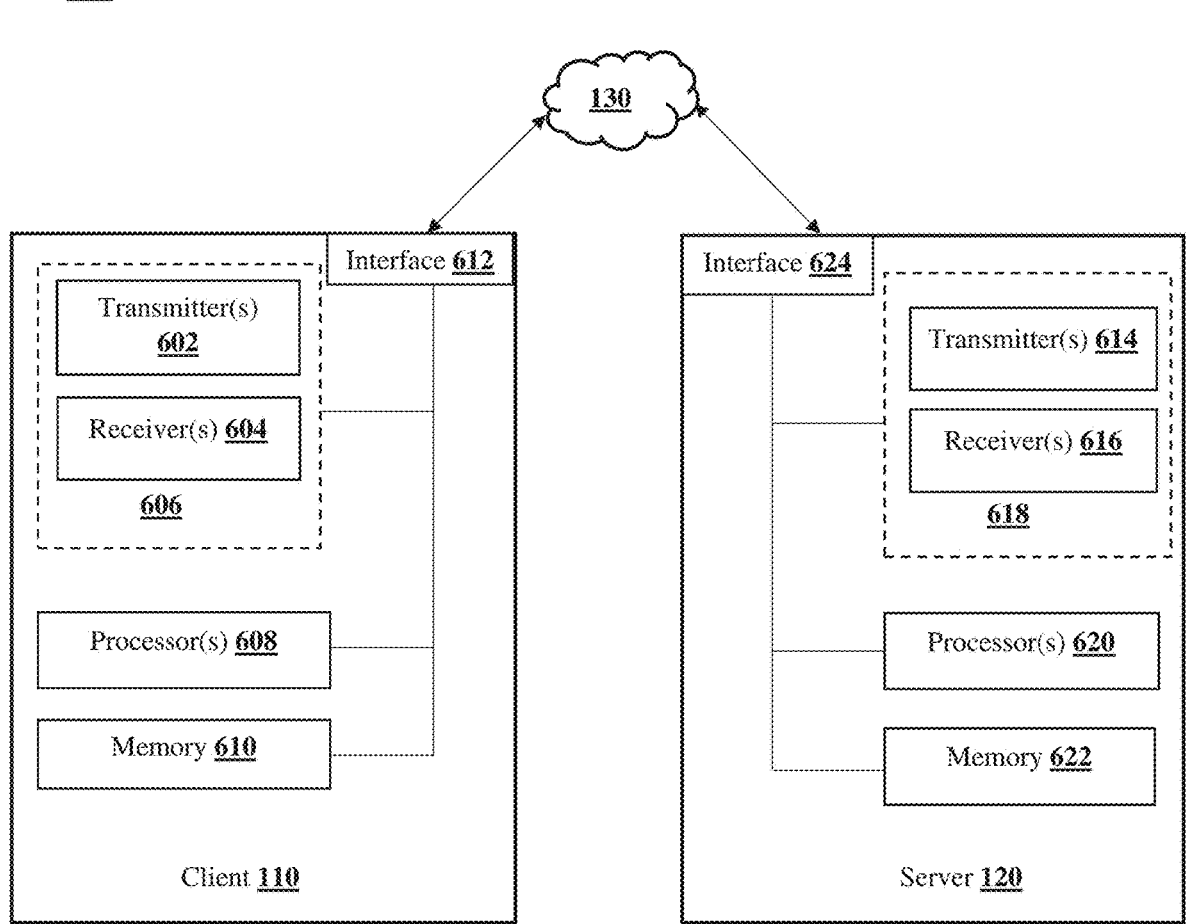

FIG. 6 shows a high-level block diagram 600 of the communication system 100, in accordance with some embodiments of the present disclosure.

Figure 7:
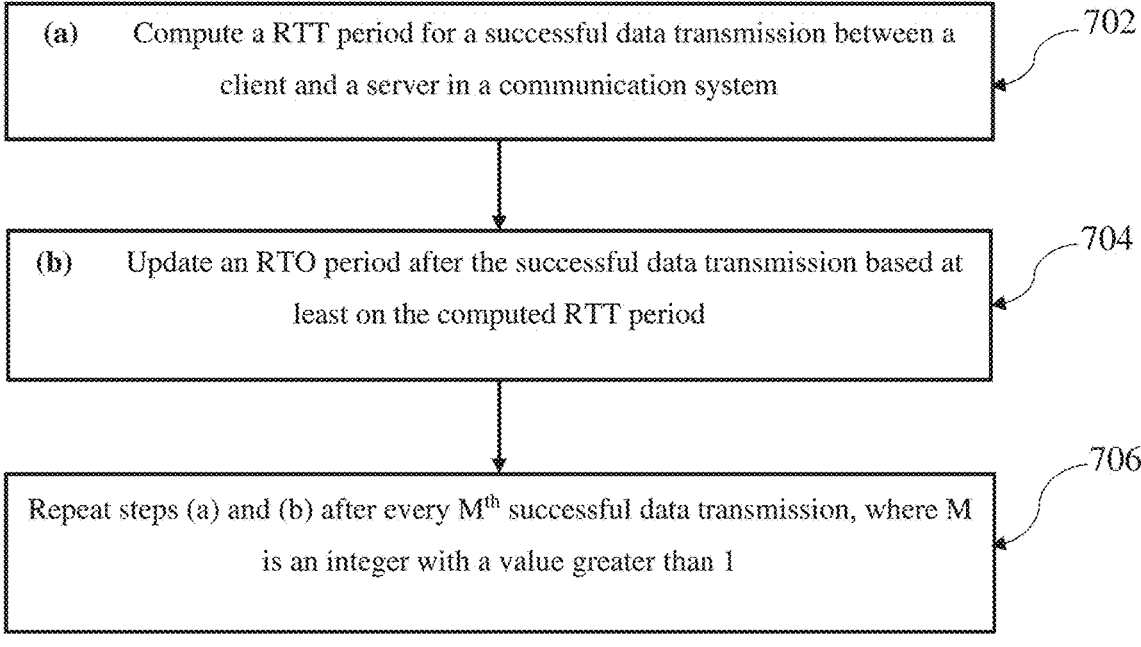

FIG. 7 shows a flowchart illustrating an exemplary method 700 of dynamically updating the RTO period for data transmissions between the client 110 and the server 120 in the communication system 100, in accordance with some embodiments of the present disclosure.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably throughout the description. In the context of present disclosure, the terms "transmitting network device", "client", and "client device" may be used interchangeably throughput the description. Further, the terms like "receiving network device" and "server" may be used interchangeably throughput the description.

In the following detailed description of the embodiments of the present disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

In the context of present disclosure, the term "data packet" is used generically to refer to a single piece of data that travels along a given path in the communication system. Each data packet may contain various types of information depending on a type of protocol used for communication such as a source port(s) number(s), destination port(s) number(s), source address, destination address, sequence number, payload data, but not limited thereto. The data packet may be given different names in the context of different protocols such as a data unit, a data segment, a data block, a frame, etc.

In the context of present disclosure, a "data transmission" or "transaction" may be defined as transmission of a data packet from a client to a server in a communication system. The data transmission may relate to a purchase, shopping, hooking, or reservation operation, but not limited thereto. Further, a "successful data transmission" or "successful transaction" may be defined as a transmission of a data packet from the client to the server and then receiving acknowledgement of the transmission of the data packet from the server. The successful data transfer may also be referred to as a "request-response pair".

The present disclosure describes methods, apparatuses, and computer readable media for dynamically updating a retransmission timeout (RTO) period for data transmissions in a communication system. The various embodiments for dynamically updating the RTO period are described in more detail in the forthcoming paragraphs.

Referring now to FIG. 1, an exemplary communication system 100 is shown in which the techniques of the present disclosure may be implemented. The communication system 100 may comprise at least one client 110-1, 110-2, 110-3 (hereinafter individually or collectively denoted as "client 110" or "client device 110") which may be in communication with at least one server 120-1, 120-2 (hereinafter individually or collectively denoted as "server 120") via a communication network 130. The at least one client device 110 may be any mobile or non-mobile computing device including, but not limited to, a phone (e.g., a cellular phone or smart phone), a pager, a laptop computer, a desktop computer, a wireless handset, a portable communication device, a portable computing device (e.g., a personal data assistant), an entertainment device (e.g., a music or video device, or a satellite radio), a global positioning system device, Internet-of-Things (IoT)-enabled device, or any other suitable computing device capable of exchanging data using a wired or wireless communications interface. Each of the at least one client 110 may be communicatively coupled with one or more of the at least one server 120 via the wired connection or wireless connection. The client 110 may transmit requests to the server 120 over the communication network 130. The client 110 may comprise a user device which may host web browsers and/or custom applications and may include a client user interface such as a Graphical User Interface (GUI).

The at least one server 120 may be a computing device which stores data to be transmitted to the client 110. The server 120 may take form of any content server including a Web server, a File Transfer Protocol (FTP) server, but not limited thereto. The data stored at the server 120 may comprise any combination of video and audio contents, internet web pages, highly interactive and sophisticated software applications of various service providers for providing services to customers, interactive customer data (e.g., personal data, hooking and/or reservation related data, etc.), but not limited thereto. The data stored at the server 120 may be accessed using the client 110 with the help of the web browsers and/or the custom applications running on the client 110. Specifically, based on the client-server architecture, the software applications may run on the server 120 and accessed by customers that connect to the software applications from their client devices 110 using the web browsers and/or the custom applications running on the client devices 110. In an exemplary non-limiting embodiment, the server 120 may run software applications of travel service providers and/or airline companies for providing travel-related services to the customers including viewing prices and schedules for passenger vehicles such as airplanes, buses, trains, subways, ferries, cruise ships, etc.; booking tickets for such passenger vehicles; viewing hotels; booking hotel rooms vehicle rental reservations; paying online for bookings and/or reservations' and the like.

The communication network 130 may include one or more private and/or public networks (e.g., the Internet) that enable exchange of data such as the Internet, a local area network (LAN), a wide area network (WAN), Metropolitan Area. Network (MAN), a cellular voice/data network, one or more high speed bus connections, and/or other such types of communication network. The communication network 130 may use standard communication technologies and/or protocols such as 5G, 4G, Ethernet, 802.11, Transmission Control Protocol/Internet Protocol (TCP/IP), Hypertext Transport Protocol (HTTP), File Transfer Protocol (FTP), etc. Data can be exchanged over the communication network 130 according to different data exchange technologies and/ or formats such as the hypertext markup language (HTML) and the extensible markup language (XML). In one embodiment, the communication network 130 may include or otherwise cover networks or subnetworks, each of which may include, for example, a wired or wireless data pathway.

In one non-limiting embodiment, the communication system 100 may comprise a packet switched network (PSN) providing a feature of data retransmission using a protocol that supports data retransmission. In the packet switched network, data to be transmitted from the client 110 to the server 120 may be first divided into one or more small data packets DP-1, DP-2, . . . , DP-n and then the one or more small data packets may be transmitted over the network 130 in accordance with a communication protocol. In one non-limiting embodiment, the communication protocol may be Transmission Control Protocol (TCP) which provides reliable data transmission. The small data packets allow a faster, more efficient data transfer and better utilization of a communication medium/channel. After dividing the data to be transmitted into one or more small data packets, the client 110 may start transmission of the one or more data packets using the TCP. Due to network congestion or traffic load balancing, or unpredictable network behavior, some of the data packets may be lost or damaged. TCP may identify such packets and request retransmission of the lost or damaged data packets.

Referring now to FIG. 2 which shows an exemplary time chart 200 showing a general transmission of data packets between the client 110 and the server 120 using TCP. As shown in FIG. 2, first a TCP connection may be established between the client 110 and the server 120. Thereafter, the client 110 may transmit a first data packet DP-1 of the one or more data packets to the server 120 using TCP as the communication protocol. Upon receiving the data packet DP-1, the server 120 may transmit a response/acknowledgment ACK_DP-1 corresponding to the received data packet DP-1 to the client 110. A time difference between transmission of the data packet DP-1 from the client 110 to the server 120 and reception of the acknowledgement ACK_DP-1 at the client 110 may be defined as a "round trip time" (RTT). Such transmission of the data packet for which the client 110 receives ACK from the server 120 may be termed as a "successful data transmission" or "successful transmission of the data packet". Here, ACK does not mean to acknowledge the transmission of the data packet DP-1 but to acknowledge that the server 120 safely and correctly received the data packet (i.e., the data packet is not lost/damaged). Sometimes the client 110 may not receive an acknowledgement from the server 120 corresponding to transmission of a data packet which means either the server 120 did not receive the data packet (e.g., when the data packet is lost in the communication system 100 before reaching the server 120) or the server 120 received a damaged data packet.

As shown in FIG. 2, the client 110 may transmit a second data packet DP-2 to the server 120 but the second data packet DP-2 is lost midway before reaching the server 120. In such case, the client 110 does not receive any acknowledgement from the server 120 and the client 110 retransmits the lost second data packet DP-2 after waiting for a certain time period. This certain time period for which the client 110 waits for an acknowledgement from the server 120 after transmitting the data packet and before retransmitting the same data packet is called a "retransmission timeout" (RTO) period, as shown in FIG. 2. Hence, the RTO period may be defined as the time difference between a time of transmission of a particular data packet from the client 110 to the server

120 and a time of a retransmission of the same particular data packet from the client 110 to the server 120 when an acknowledgement corresponding to the particular data packet is not received by the client 110 from the server 120.

As explained earlier in the background section, if the value of the RTO period for data transmissions between the client 110 and the server 120 is fixed then it may lead to degradation in quality of service and/or wastage of network resources. To overcome this problem, TCP may set the value of RTO as a function of the RTT i.e., if the value of RTT changes for different data transmissions between the client 110 and the server 120, the value of RTO is updated dynamically.

Referring now to FIG. 3 which shows an exemplary time chart 300 illustrating dynamically updating an RTO period for data transmissions between the client 110 and the server 120 in the communication system 100, in accordance with some embodiments of the present disclosure. As shown in FIG. 3, the client 110 may dynamically update the RTO period after each successful data transmission between the client 110 and the server 120. Initially, the RTO period may be assigned a default value i.e., $RTO_0$. When the data transmission starts, the client 110 may transmit a data packet DP-1 of the one or more data packets to the server 120 using TCP as communication protocol. Upon receiving the data packet DP-1, the server 120 may transmit a response/ acknowledgment ACK_DP-1 corresponding to the received data packet DP-1 to the client 110. The client 110 may compute the time difference between the transmission of the data packet DP-1 from the client 110 and reception of the acknowledgement ACK_DP-1 at the client 110. This time difference may be denoted as $RTT_1$ and may also be referred as the first RTT which indicate a round trip time corresponding to the successful transmission of the data packet DP-1 between the client 110 and the server 120. The client 110 may then compute/update a value of the RTO period $RTO_1$ after the first successful data transmission using the following equation:

$$RTO_n = \frac{[(RTO_{n-1}) * (n-1)] + RTT_n}{n} \quad (1)$$

where, n is a sequence number of a current successful data transmission, $RTO_n$ is an instantaneous value of the RTO period immediately after the current successful data transmission, $RTO_{n-1}$ is a value of an immediate previous RIO period (i.e., a value of the RTO period just before the current successful data transmission), and $RTT_n$ is a value of the RTT period corresponding to the current successful data transmission.

For the first successful data transmission: n=1 and $RTO_{n-1}=RTO_0$. Therefore, using equation (1), the value of the RTO period after the first successful data transmission i.e., $RTO_1$ is equal to the first RTT period i.e., $RTO_1=RTT_1$. Now, the client 110 may transmit another data packet DP-2 of the one or more data packets to the server 120 using TCP as communication protocol. Upon receiving the data packet DP-2, the server 120 may transmit a response/acknowledg- ment ACK_DP-2 corresponding to the received data packet DP-2 to the client 110. The client 110 may then compute the RTT period corresponding to the successful transmission of the data packet DP-2. The computed RTT period may be denoted as $RTT_2$ and referred to as the second RTT period.

The client 110 may then immediately update a value of the current RTO period i.e., $RTO_1$ to $RTO_2$ after the second successful data transmission, where updating the value of the current RTO period comprises computing the value of $RTO_2$ using equation (1).

In this manner, the client 110 may keep on dynamically updating the value of the RTO period immediately after each successful data transmission between the client 110 and the server 120. For example, as shown in FIG. 3, the client 110 may keep on updating the value of the RTO period to $RTO_1$, $RTO_2$, $RTO_3$, $RTO_4$, and $RTO_5$ after the successful data transmission of the data packets DU1-DU5, respectively. It may be noted here that the client 110 updates the RTO period immediately after a successful data transmission but before an immediate next successful or unsuccessful data transmis- sion.

If the client 110 does not receive an acknowledgement from the server 120 corresponding to transmission of a particular data packet which means either the server 120 did not receive the data packet (e.g., when the data packet is lost in between the client 110 and the server 120) or the server 120 received a damaged data packet, then the client 110 may retransmit the particular data packet after a time period equal to the instantaneous RTO period. For example, when the client 110 does not receive ACK corresponding to a trans- mission of the data packet DP-5 from the server 120 then the client 110 may retransmit the data packet DP-5 after the RTO period of that instant i.e., $RTO_4$, as shown in FIG. 3. Sometimes the client 110 may not receive acknowledgement even for the retransmitted data packet DP-5. In that case, the client 110 may again retransmit the data packet DP-5 after the time period of the $2*RTO_4$. If the client 110 still does not receive the acknowledgement corresponding to the retrans- mitted data packet DP-5, the client 110 may again retransmit the data packet DP-5 after the time period of the $4*RTO_4$, and so on. That is, when the client 110 does not receive acknowledgement corresponding to a retransmitted data packet, the client 110 may again retransmit the retransmitted data packet after a time period which is twice of an instan- taneous RTO period. However, the present disclosure is not limited thereto and in general the client may again retransmit the retransmitted data packet after a time period which is a multiple of the instantaneous RTO period.

In the exemplary embodiment of FIG. 3, it is assumed that the first data transmission between the client 110 and the server 120 is a successful data transmission. However, this may not be true always and in general, one or more unsuccessful data transmission may occur before a first successful data transmission. For example, one or more data packets may be lost or may get damaged before the first successful data transmission. The default value of the RTO period i.e., $RTO_0$ may be used to implement data retrans- mission in such cases. The default value of the RTO period i.e., $RTO_0$ gets updated after the first successful data trans- mission using equation (1).

In this manner, the RTO period is dynamically updated after each successful data transmission between the client 110 and the server 120. It may be noted that in the exemplary embodiment of FIG. 3, in order to keep the RTO period updated, the client 110 computes the RTO period after each successful data transmission between the client 110 and the server 120, and hence, computation load is huge on the client 110.

In one non-limiting embodiment, in order to reduce the RTO computation load on the client 110, the present disclo- sure proposes a data transmission scheme where the RTO period is dynamically updated after every $M^{th}$ successful data transmission between the client 110 and the server 120 and not after every successful data transmission, where M is an integer with a value greater than 1. The value of M may depend on one or more factors including, but not limited to, a current network traffic or link traffic, a change in configuration of the server 120, etc. The network traffic may indicate traffic at one or more particular destination ports of the server 120 which are used for the data transmissions. From the perspective of the client, a destination port identifies a location of the data/service on the server 120 for serving the client 110. Depending on the one or more factors, the value of M may be set to a fixed value or to a configurable/dynamic value for the data transmissions between the client 110 and the server 120. Forthcoming paragraphs now describe the various embodiments of setting or selecting the values of M for dynamically updating the RTO period.

In one non-limiting embodiment of the present disclosure, the value of M may be set to a fixed value for all data transmissions between the client 110 and the server 120. For instance, before initiating the data transmissions between the client 110 and the server 120, the value of M may be set to the fixed value by an operator. Alternatively, the client 110 may automatically set the value of M to the fixed value based on one or more of the above-mentioned factors i.e., based on the current network traffic, the change in configuration of the server, but not limited thereto. The value of M is fixed to a value which is neither too high nor too low because when the value of M is kept too high, then the RTO would be updated rarely or infrequently which may impact performance of the communication system 100. Similarly, when the value of M is kept too low, the RTO would be updated very frequently thereby increasing the computation load on the client 110 and degrading the overall performance of the client 110 (and of the communication system 100, more generally).

In another non-limiting embodiment of the present disclosure, the value of M may be dynamic. In such embodiment, the client 110 may initially determine a range of values for selecting M and then the client 110 may select a value of M from the determined range at different time intervals for dynamically updating the RTO period for the data transmissions between the client 110 and the server 120.

In one non-limiting embodiment, the range of values for M may be determined based on the network traffic or link traffic. The client 110 may continuously monitor the network traffic and based on the network traffic, the client 110 may determine utilization of the one or more destination ports. For example, if the maximum capacity of a port is to handle X transmissions/second and current network traffic handled by the port is X/2 transmissions/second, then the client 110 may determine that the port is 50% utilized. Based on the determined port utilization, the range of values for M may be determined from one of (10%-30%) of the current network traffic (referred to as low range for M), (30%-50%) of the current network traffic (referred to as medium range for M), and (50%-100%) of the current network traffic (referred to as high range for M). For example, if the percentage of port utilization falls within the range of (10%-30%) of the maximum capacity of the port, then the client 110 may determine the range of values for M as (10%-30%) of the current network traffic. Similarly, if the percentage of the port utilization falls within (30%-50%,) of the maximum capacity of the porty, then the client 110 may determine the range of values for M as (30%-50%) of the current network traffic and if the percentage of port utilization falls within (50%-100%) of the maximum capacity of the port, then the client 110 may determine the range of values for M as (50%-100%) of the current network traffic. The mapping between the port utilization percentages and the range of values for M may be stored in a memory of the client 110.

Consider that the client 110 initiates calculation of the range of values for M at a particular time instance when the network traffic is 1200 transmissions/sec and consider that the maximum port capacity is 2400 transmissions/second i.e., the port utilization is 50%. Since the port utilization falls within the mid-range utility of the port (i.e., 30%-50%), the range of values for M may be determined as 30%-50% of the network traffic i.e., 360-600. The range of values for M determined based on the network traffic may also be referred to as "a first range of values for M."

It may be understood to a person skilled in the art that the above-mentioned percentages of port utilizations and ranges of values for M in terms of network traffic are just an example. In general, the port utilizations percentages and ranges of values for M in terms of network traffic may be different from the above-mentioned percentages. However, it is to be noted that the above-mentioned percentages of port utilizations and ranges of values for M in terms of network traffic are set taking into account the fact that the value of M should be neither too high nor too low. To be specific, if the data transmissions or the network traffic is high, then it is desired to update the RTO period less frequently. In other words, if the network traffic is high, the range of values for M should also be high so that the selected values of M are high to update the RTO less frequently and vice versa. In summary, the range of values for M is kept directly proportional to the network traffic to keep the value of RTO period optimal while reducing the RTO computation load on the client 110. Some communication systems may require the RTO period to be updated more frequently to keep the value of RTO period more accurate. In such communication systems, the range of values of M may be determined as (10%-30%) of the current network traffic (referred to as low range for M) or (30%-50%) of the current network traffic (referred to as medium range for M).

Once the range of values for M is determined, the client 110 may start dynamically updating the RTO period using equation (1) by selecting a same or different values of M from the range of values for M at different time intervals for the data transmissions between the client 110 and the server 120. Parallelly, the client 110 keeps on monitoring the network traffic. If the client 110 determines that a change in the network traffic is more than a predefined threshold, the client 110 may update the range of values for M based on the current network traffic. At the same time, the client 110 keeps updating the RTO period using equation (1) by selecting the same or different values of M from the updated range of values for M at different time intervals for the data transmissions between the client 110 and the server 120.

In one non-limiting embodiment, the client 110 may randomly select the same value of M from the determined range at different time intervals which means that updating the RTO period will be repeated after every M successful data transmission, where M is a static value greater than 1. For instance, consider that the range of values for M is determined to be 120-240 and consider that the client 110 randomly selects the value of M as 130, then the client 110 may keep updating the RTO after every $130^{th}$ successful data transmission i.e., after $1^{st}$, $130^{th}$, $260^{th}$, $390^{th}$, ..., $(130*N)^{th}$ successful data transmission between the client 110 and the server 120. This is same as setting the value of M to the fixed value (as illustrated in FIG. 3) except that the fixed value of M in this embodiment is selected from a range of values for M which is determined based on the network traffic.

In another non-limiting embodiment, the client 110 may randomly select different values of M from the range of values for M at regular or irregular time intervals and keep updating the RTO period after every M successful data transmission using equation (1). For instance, consider that the range of values for M is determined to be 120-240 and consider that the client 110 randomly selects the value of M as 130 at a first-time instance then the client 110 may keep updating the RTO period after every $130^{th}$ successful data transmission i.e., after $1^{st}$, $130^{th}$, $260^{th}$, $390^{th}$, . . . , (130\*N) th successful data transmission. Consider that the client 110 selects another random value of M (e.g., 150) at a second time instance and consider that a sequence number of successful data transmission at the second time instance is 1300. When the value of M changes to 150, the client 110 may start updating the RTO period after every $150^{th}$ successful data transmission starting from 1300 i.e., after $1450^{th}$, $1600^{th}$, $1750^{th}$, $1900^{th}$, . . . , $(1300+150*N)^{th}$ successful data transmission. In this manner, the client 110 may keep on updating the RTO period by randomly selecting different values of M within the range of values for M.

In another non-limiting embodiment, the client 110 may set the lowest value from the range of values for M as the value of M and start updating the RTO period after every $M^{th}$ successful data transmission using equation (1). The client 110 may keep on incrementing the value of M starting from the lowest value at regular or irregular time intervals and parallelly keep on updating the RTO period. For instance, when the range of values for M is determined to be 120-240, the client 110 may initially set 120 as the value of M and keep updating the RTO period after every $120^{th}$ successful data transmission i.e., after $1^{st}$, $120^{th}$, $240^{th}$, $360^{th}$, . . . , $(120*N)^{th}$ successful data transmission. Consider that at a second time instance, the client 110 increments the value of M to 150 and consider that a sequence number of successful data transmission at the second time instance is 1200. When the value of M is incremented to 150, the client 110 may start updating the RTO period after every $150^{th}$ successful data transmission starting from 1200 i.e., after $1350^{th}$, $1500^{th}$, $1650^{th}$, $1900^{th}$, . . . , $(1200+150*N)^{th}$ successful data transmission. In this manner, the client 110 may keep on updating the RTO period while incrementing the value of M within the range of values for M.

In another non-limiting embodiment, the client 110 may set the highest value from the range of values for M as the value of M and start updating the RTO period after every $M^{th}$ successful data transmission using equation (1). The client 110 may keep on decrementing the value of M starting from the highest value at regular or irregular time intervals and parallelly keep on updating the RTO period. For instance, when the range of values for M is determined to be 120-240, the client 110 may initially set 240 as the value of M and keep updating the RTO period after every $240^{th}$ successful data transmission i.e., after $1^{st}$, $240^{th}$, $480^{th}$, $720^{th}$, . . . , $(240*N)^{th}$ successful data transmission. Consider that at a second time instance, the client 110 decrements the value of M to 230 and consider that a sequence number of successful data transmission at the second time instance is 2400. When the value of M is decremented to 230, the client 110 may start updating the RTO period after every $230^{th}$ successful data transmission starting from 2400 i.e., after $2630^{th}$, $2860^{th}$, $3090^{th}$, . . . , $(2400+230*N)^{th}$ successful data transmission. In this manner, the client 110 may keep on updating the RTO period while decrementing the value of M within the range of values for M.

In another non-limiting embodiment, the client 110 may follow a hill approach for selecting values of M from the range of values for updating the RTO period. In a first hill approach, the client 110 may initially start updating the RTO period while incrementing the value of M at regular intervals starting from the lowest value within the range of values for M. When the value of M reaches to a first particular value within the range of values for M, the client 110 may automatically start decrementing M starting from the first particular value of M attained while incrementing the value of M within the range of values for M. The first particular value may be any value within the range of values for M. In one non-limiting embodiment, the first particular value may be a value which is nearest or equal to the highest value within the range of values for M. The client 110 may keep on repeating the operations of incrementing and decrementing the values of M within the range of values for M to update the RTO period. In a second hill approach, the client 110 may initially start updating the RTO period while decrementing the value of M starting from the highest value of M within the range of values for M and when the value of M reaches to a second particular value within the range of values for M, the client 110 may automatically start incrementing the value of M starting from the second particular value attained while decrementing the value of M within the range of values. The second particular value may be any value within the range of values for M. In one non-limiting embodiment, the second particular value may be a value which is nearest or equal to the lowest value within the range of values for M. The client 110 may keep on repeating the operations of decrementing and incrementing the values of M within the range of values for M to update the RTO period.

In another non-limiting embodiment, the range of values for M may be preset by an operator or the client 110 may automatically set the range of values for M based on the fact that the value of M within the range of values should be neither too high nor too low. This range of values for M may also be referred to as "a second range of values for M". The first range of values for M may be same or different from the second range of values for M. In one non-limiting embodiment, the first range of values for M may be a subset of the second range of values for M. In yet another one non-limiting embodiment, the first range of values for M and the second range of values for M may partially overlap with each other.

In one non-limiting embodiment, once the second range of values for M is set, the client 110 may start dynamically updating the RTO period using equation (1) by selecting same or different values of M from the second range at different time intervals for the data transmissions between the client 110 and the server 120. In one non-limiting embodiment, the client 110 may randomly select a value from the second range as the value of M and start updating the RTO period after every M successful data transmission. For instance, consider that the second range of values for M is set to 100-300 and consider that the client 110 randomly selects the value of M as 130, then the client 110 may start updating the RTO after every $130^{th}$ successful data transmission i.e., after $1^{st}$, $130^{th}$, $260^{th}$, $390^{th}$, . . . , $(130*N)^{th}$ successful data transmission between the client 110 and the server 120. This embodiment is same as setting the value of M to a fixed value (as illustrated in FIG. 3) except that the fixed value of M in this embodiment is selected from the second range of values for M.

In another non-limiting embodiment, the client 110 may randomly select different values of M from the second range at regular or irregular time intervals and start updating the RTO period after every M successful data transmission using equation (1). For instance, consider that the range of values for M is 100-300 and consider that the client randomly selects the value of M as 130 at a first-time instance then the client 110 may keep updating the RTO period after every $130^{th}$ successful data transmission i.e., after $1^{st}$, $130^{th}$, $260^{th}$, $390^{th}$, . . . , $(130*N)^{th}$ successful data transmission. Consider that at a second time instance, the client 110 selects another random value of M (e.g., 150) and consider that the sequence number of successful data transmission is 1300 at the second time instance. When the value of M changes to 150, the client 110 may start updating the RTO period after every $150^{th}$ successful data transmission starting from $1300^{th}$ successful data transmission i.e., after $1450^{th}$, $1600^{th}$, $1750^{th}$, $1900^{th}$, . . . , $(1300+150*N)^{th}$ successful data transmission. In this manner, the client may keep on updating the RTO period by randomly selecting different values of M within the second range of values for M.

In another non-limiting embodiment, the client 110 may set a lowest value of M, or a highest value of M, or both from the second range of values for M. In one non-limiting embodiment, the client 110 may set a value from the second range as the lowest value of M and keep on incrementing the value of M starting from the lowest value at regular or irregular time intervals and parallelly keep on updating the RTO period. For instance, when the second range of values for M is 100-300, the client 110 may initially set 120 as the lowest value of M and keep updating the RTO period after every $120^{th}$ successful data transmission i.e., after $1^{st}$, $120^{th}$, $240^{th}$, $360^{th}$, . . . , $(120*N)^{th}$ successful data transmission. The client 110 may then increment the value of M to 150 at a second time instance. Consider that the sequence number of the current successful data transmission at the second time instance is 1200. When the value of M is incremented to 150, the client 110 may start updating the RTO period after every $150^{th}$ successful data transmission starting from 1200 i.e., after $1350^{th}$, $1500^{th}$, $1650^{th}$, $1900^{th}$, . . . , $(1200+150*N)^{th}$ successful data transmission. In this manner, the client may keep on updating the RTO period while incrementing the value of M within the second range of values for M.

In another non-limiting embodiment, client 110 may set a value from the second range as the highest value of M and start updating the RTO period after every $M^{th}$ successful data transmission using equation (1). The client 110 may keep on decrementing the value of M starting from the highest value at regular or irregular time intervals and parallelly keep on updating the RTO period. For instance, when the second range is 100-300, consider that the client 110 sets 240 as the highest value of M. The client 110 may start updating the RTO period after every $240^{th}$ successful data transmission i.e., after $1^{st}$, $240^{th}$, $480^{th}$, $720^{th}$, . . . , $(240*N)^{th}$ successful data transmission. Consider that the client 110 decrements the value of M to 230 at a second time instance and consider that the sequence number of current successful data transmission at the second time instance is 2400. When the value of M is decremented to 230, the client 110 may start updating the RTO period after every 230 successful data transmission starting from 2400 i.e., after $2630^{th}$, $2860^{th}$, $3090^{th}$, . . . , $(2400+230*N)^{th}$ successful data transmission. In this manner, the client 110 may keep on updating the RTO period while decrementing the value of M within the second range of values for M.

In another non-limiting embodiment, the client 110 may follow any of the first or second hill approach for selecting values of M from the second range of values for M for updating the RTO period. In the first hill approach, the client 110 may initially start updating the RTO period while incrementing the value of M starting from the lowest value of M and when the value of M reaches to a first particular value within the range of values for M, the client 110 may automatically start decrementing the value of M starting from the first particular value of M attained while incrementing the value of M within the second range. The first particular value may be any value within the second range of values for M. In one non-limiting embodiment, the first particular value may be a value which is nearest or equal to the highest value within the second range of values for M. The client 110 may keep on repeating the operations of incrementing and decrementing the values of M within the second range of values for M to update the RTO period. In the second hill approach, the client 110 may initially start updating the RTO period while decrementing the value of M starting from the highest value of M and when the value of M reaches to a second particular value within the second range of values for M, the client 110 may automatically start incrementing the value of M starting from the second particular value of M attained while decrementing the value of M within the second range. The second particular value may be any value within the second range of values for M. In one non-limiting embodiment, the second particular value may be a value which is nearest or equal to the lowest value within the second range of values for M. The client 110 may keep on repeating the operations of decrementing and incrementing the values of M within the second range of values for M to update the RTO period.

In this manner, the first and/or second ranges of values for M are set or determined and thereafter the RTO period is continuously updated by selecting values of M from the range of values for M. Referring now to FIG. 4, which shows an exemplary time chart 400 illustrating dynamically updating the RTO period for every $M^{th}$ data transmission between the client 110 and the server 120, in accordance with some embodiments of the present disclosure. As shown in FIG. 4, initially the RTO period may be assigned a default value as $RTO_0$. When the data transmission starts, the client 110 may transmit a data packet DP-1 of the one or more data packets to the server 120 using TCP as communication protocol. The client 110 may update the RTO period after the successful transmission of data packet DP-1 between the client 114) and the server 120 using equation (1) and then continue updating the RTO period using equation (1) after every $M^{th}$ successful data transmission including the first successful data transmission i.e., the RTO period may be updated after 1, M, 2M, 3M, 4M, . . . , $(N*M)^{th}$ successful data transmission between the client 110 and the server 120 using equation (1). Here the value of M may indicate the sequence number of the data transmission after which the RTO period is to be updated. For example, if the value of M is 120 then first the client 110 computes the RTO period after the first successful data transmission using equation (1) and then the RTO period is continuously updated after every $120^{th}$ successful data transmission including the first successful data transmission i.e., the RTO period is to be updated after 1, $120^{th}$, $240^{th}$, $360^{th}$, $480^{th}$, . . . , $(120*N)^{th}$ successful data transmission between the client 110 and the server 120 using equation (1).

Consider that the updated value of the RTO period after the first successful transmission is $RTO_1$. The client 110 may then update the RTO period $RTO_1$ after the successful data transmission of the data packet DP-120 using equation (1). Consider that the updated RTO period after the $120^{th}$ successful data transmission is $RTO_{120}$. Next, the RTO period $RTO_{120}$ may be updated after successful transmission of data packet DP-240 (i.e., after $240^{th}$ successful data transmission). In the similar manner, the client 110 may keep on dynamically updating the value of the RTO period after every $120^{th}$ successful data transmission, as shown in FIG. 4.

If the client 110 does not receive an acknowledgement from the server 120 corresponding to transmission of a particular data packet, then the client 110 may retransmit the particular data packet after a time period equal to the instantaneous RTO period. For example, when the client 110 does not receive ACK corresponding to a transmission of the data packet DP-180 from the server 120 then the client 110 may retransmit the data packet DP-180 after the RTO period of that instant i.e., $RTO_{120}$, as shown in FIG. 4.

In this manner, the RTO period is dynamically updated after every $M^{th}$ successful data transmission between the client 110 and the server 120. Since the RTO period is updated after every $M^{th}$ successful data transmission and not after each successful data transmission, the load of updating/ computing RTO on the client 110 almost reduces by a multiple of M, thereby saving computing resources of the client 110 and increasing the performance of the client 110.

In the above-described embodiment of FIG. 4, the value of M is considered as a fixed value i.e., 120 for the data transmissions between the client 110 and the server 120. In another non-limiting embodiment of the present disclosure, the value of M may change during the data transmissions between the client 110 and the server 120 based on the one or more factors as mentioned above. For instance, the value of M may change based on a network traffic. Consider that in the exemplary embodiment of FIG. 4, the value of M changes to 150 after some time and consider that the sequence number of the successful data transmission is 1200 when the value of M changes. The client 110 may then start updating the RTO period after every $150^{th}$ successful data transmission starting from $1200^{th}$ successful data transmission i.e., after $1350^{th}$, $1500^{th}$, $1650^{th}$, $1800^{th}$, . . . , $(1200+150*N)^{th}$ successful data transmission, as shown in FIG. 5. In this manner, the client 110 may keep on updating the RTO period based on different values of M.

If the client 110 does not receive an acknowledgement from the server 120 corresponding to transmission of a particular data packet, then the client 110 may retransmit the particular data packet after a time period equal to the instantaneous RTO period. For example, when the client 110 does not receive ACK corresponding to a transmission of the data packet DP-1650 to the server 120 then the client 110 may retransmit the data packet DP-1650 after the RTO period of that instant i.e., $RTO_{1500}$, as shown in FIG. 5.

In this manner, the RTO period is dynamically updated after every $M^{th}$ successful data transmission (where M is configurable) between the client 110 and the server 120. Since the value of M is configurable depending on the current network conditions (e.g., network traffic), the computed RTO period is more realistic and more accurate. In unstable communication systems, the network conditions (e.g., network traffic, server configurations, channel quality, etc.) keep on changing. Hence, in such systems, the RTO period needs to be updated continuously. On the other hand, in stable systems, the network conditions (e.g., network traffic, server configurations, channel quality, etc.) may not change frequently and stabilize over time and hence, the updating of the RTO period may be stopped when the RTO period attains an optimal value. The RTO period is said to be optimal when the RTO period approaches the instantaneous RTT periods or falls within a defined range of RTT periods.

In stable systems, dynamically updating the RTO period after every $M^{th}$ successful data transmission between the client 110 and the server 120 may comprise determining the defined range of RTT periods and dynamically updating the RTO period after every $M^{th}$ successful data transmissions between the client 110 and the server 120 until the RTO period falls within the defined range of RTT periods.

In one non-limiting embodiment, the defined range may be preset for a particular client-server architecture. In another non-limiting embodiment, the defined range may be updated after each successful data transmission between the client and the server e.g., by taking average of all past RTT periods corresponding to successful data transmissions between the client 110 and the server 120. However, this would require storing the past RTT periods, thereby consuming extra memory space on the client 110. In another non-limiting embodiment, in order to save the memory space on the client 110, the defined range may be determined based on selected few RTT periods.

In a first technique of determining the defined range, the client 110 may maintain an array of a defined size and after every $M^{th}$ successful data transmission between the client 110 and the server 120, the client 110 may update the array by storing a current value of the RTT period when a ceil of the current RTT period is equal to a ceil of a current RTO period. When the array becomes full, the client 110 may take an average of all RTT period stored in the array to determine an average RTT value.

In a second technique of determining the defined range, the client 110 may define a time period (e.g., in hours, days, months) and may initialize a circular array of a defined size. The client may keep on updating the circular array after every $M^{th}$ successful data transmission between the client 110 and the server 120 by storing a current value of the RTT period into the circular array when a ceil of the current RTT period is equal to a ceil of a current RTO period. Upon expiry of the defined time period and when the circular array becomes full, the client 110 may take an average of all RTT periods stored in the array to determine an average RTT value.

In the above techniques of determining the defined range of RTT periods, after determining the average RTT value, the client 110 may determine a lowest value of the defined range by subtracting an offset from the average RTT value and determine a highest value of the defined range by adding the offset into the average RTT value. The defined range of RTT periods may then be determined based on the lowest and highest values as follows.

Defined range of RTT periods=[Lowest value,Highest value]

The client 110 may keep dynamically updating the RTO period after every $M^{th}$ successful data transmission between the client 110 and the server 120 until the RTO period falls within the defined range of RTT periods. The client 110 may update the defined range of RTT periods whenever there is any change in the network conditions. For example, if the network traffic changes, the client 110 may update the defined range of RTT periods using any of the first or second techniques of determining the defined range of RTT periods. Whenever RTO goes outside of the defined range of RTT periods, the client may start updating the RTO period to maintain the RTO period within the defined range of RTT periods.

In one non-limiting embodiment, while updating the array or the circular array, sometimes the ceil values of RTO periods may remain same. This means that the RTO period has attained an optimal value. Upon determining that ceil values of a defined number of consecutive RTO periods are same, the client 110 may stop updating the RTO even before the array becomes full and/or the time period expires.

The techniques of the present disclosure provide various technical advantages. For example, the techniques of the present disclosure reduce the load of RTO calculation on the client by updating the RTO period after every $M^{th}$ (M>1) successful data transmission, thereby saving computing resources of the client, and increasing the performance of the client (and of the communication system, more generally). Further, techniques of the present disclosure provide a more accurate and optimal estimate of RTO period by calculating the RTO period based on instantaneous RTT periods while dynamically changing the value of M. The optimal and accurate RTO period guarantees delivery of a data packet even if the data packet is lost or damaged, thereby providing reliable communication between the client and the server. Additionally, use of optimal and accurate RTO period reduces load on server as well. Hence, the techniques of the present disclosure provide efficient data transmission in a client-server architecture.

Referring now to FIG. 6, which illustrates a block diagram 600 illustrating key components of the communication system 100, in accordance with some embodiments of the present disclosure. It may be understood to a person skilled in art that the present disclosure is not limited to the communication system 100 illustrated in FIG. 1 or 6 and may be implemented in various other communication systems as well, other than the ones shown in FIG. 1 or 6.

According to an embodiment of the present disclosure, the communication system 100 may comprise, but not limited to, a client 110 which may be in communication with a server 120. It may be noted here that the communication system 100 may generally comprise a plurality of clients and a plurality of servers. However, for the sake of simplicity, only one client 110 and only one server 120 is shown in FIG. 6.

In one non-limiting embodiment of the present disclosure, the client 110 may comprise at least one transmitter 602, at least one receiver 604, at least one processor 608, at least one memory 610, at least one interface 612, and at least one antenna (not shown). The at least one transmitter 602 may be configured to transmit data packets or requests or information to the server 120 using the at least one antenna (not shown) and the at least one receiver 604 may be configured to receive data packets or responses (e.g., acknowledgements) from the server 120 using the at least one antenna. In one non-limiting embodiment, the at least one transmitter and receiver may be collectively represented as a single transceiver module 606. In one non-limiting embodiment, the at least one processor 608 may be communicatively coupled with the transceiver 606 for receiving and transmitting data and/or information.

In one non-limiting embodiment of the present disclosure, the server 120 may comprise at least one transmitter 614, at least one receiver 616, at least one processor 620, at least one memory 622, at least one interface 624, and at least one antenna (not shown). The at least one transmitter 614 may be configured to transmit data or information to the client device 110 using the at least one antenna and the at least one receiver 616 may be configured to receive data/information from the client 110 using the at least one antenna. The at least one transmitter and receiver may be collectively represented as a single transceiver module 618. In one non-limiting embodiment, the at least one processor 620 may be communicatively coupled with the transceiver 618 for receiving and transmitting data and/or information. In one non-limiting embodiment, each of the client 110 and the server 120 may comprise at least one controller (not shown) which may be configured to control the operations of respective units/components of the client and server.

The processors 608, 620 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. The interfaces 612, 624 may include a variety of software and hardware interfaces, for example, a web interface, a graphical user interface, an input device-output device (I/O) interface, an access network interface, and the like. The I/O interface may allow the client 110 and the server 120 to interact with each other either directly or through other computing devices using the communication network 130. In one non-limiting embodiment, the interfaces 612, 624 may include any necessary components (e.g., network interface controllers (NICs)) to communicate via the network 130. The specific components of the interfaces 612, 624 may be selected based on the nature of the communication network 130.

The memory 610 may be communicatively coupled to the at least one processor 608 and the at least one memory 622 may be communicatively coupled to the at least one processor 620. Each one of the memories 610, 622 may comprise various types of data and/or instructions. Specifically, the memory 610 may comprise one or more thresholds, defined ranges of RTT periods, one or more arrays, one or more RTT periods, one or more RTO periods, one or more ranges for M, one or more values of M, mappings between port utilization percentages and the range of values for M etc. Each one of the memories 610, 622 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 608 may be configured to execute one or more instructions stored in the memory 610 to implement one or more of the above-mentioned functionalities of the client 110. The at least one processor 620 may be configured to execute one or more instructions stored in the memory 622 to implement one or more of the above-mentioned functionalities of the server 120.

In another non-limiting embodiment of the present disclosure, the client 110 and the server 120 may comprise various units or means. For example, the client 110 may comprise a computing unit, an updating unit, a selecting unit, a determining unit, a setting unit, an incrementing unit, a decrementing unit, etc. In an embodiment, the units may be dedicated hardware units capable of executing one or more instructions stored in the memory 610 for performing various operations of the client 110. In another embodiment, the units may be software modules stored in the memory 610 which may be executed by the at least one processor 608 for performing the operations of the client 110.

Referring now to FIG. 7, a flowchart illustrating a method 700 for dynamically updating a retransmission timeout (RTO) period for data transmissions in a communication system 100, in accordance with some embodiments of the present disclosure. As illustrated in FIG. 7, the method 700 includes one or more blocks illustrating the method for dynamically updating the RTO period. The method 700 is merely provided for exemplary purposes, and embodiments are intended to include or otherwise cover any method of dynamically updating the RTO period within the context of the present disclosure.

The method 700 may include, at block 702, a step (a) of computing a round-trip time (RTT) period for a successful data transmission between a client 110 and a server 120 in the communication system 100. The operations of block 702 may be performed by the at least one processor 608 of FIG. 6. For example, the at least one processor 608 may be configured to compute the RTT period for the successful data transmission between the client 110 and the server 120 in the communication system 100.

The method 700 may include, at block 704, a step (b) of updating the RTO period after the successful data transmission based at least on the computed RTT period. The operations of block 704 may be performed by the at least one processor 608 of FIG. 6. For example, the at least one processor 608 may be configured to update the RTO period after the successful data transmission based at least on the computed RTT period.

The method 700 may include, at block 706, a step of repeating the steps (a) and (b) of blocks 702 and 704, after every $M^{th}$ successful data transmission between the client 110 and the server 120, where M is an integer with a value greater than 1. The operations of block 706 may be performed by the at least one processor 608 of FIG. 6. For example, the at least one processor 608 may be configured to repeat the steps (a) and (b) of blocks 702 and 704, after every $M^{th}$ successful data transmission between the client 110 and the server 120.

In one non-limiting embodiment, the method 700 may further comprise setting a value of M to a fixed value. For example, the at least one processor 608 may be configured to set the value of M to the fixed value.

In one non-limiting embodiment, the method 700 may further comprise determining a range of values for M based on a current network traffic and at different intervals, selecting a value of M from the range of values for M. For example, the at least one processor 608 may be configured to determine the range of values for M based on the current network traffic and at different intervals, select the value of M from the range of values for M.

In one non-limiting embodiment, the method 700 may further comprise updating the range of values for M upon detecting a change in the current network traffic and at different intervals, selecting a value of M from the updated range of values for M. For example, the at least one processor 608 may be configured to update the range of values for M upon detecting the change in the current network traffic and at different intervals, select the value of M from the updated range of values for M.

In one non-limiting embodiment, the method 700 may further comprise at different intervals, randomly selecting a different value of M from a range of values for M. For example, the at least one processor 608 may be configured to randomly select a different value of M from a range of values for M at different intervals.

In one non-limiting embodiment, the method 700 may further comprise setting a value as a lowest value of M from a range of values for M; and at regular or irregular intervals, incrementing the value of M starting from the lowest value within the range of values for M. For example, the at least one processor 608 may be configured to set a value as the lowest value of M from the range of values for M; and at regular or irregular intervals, increment the value of M starting from the lowest value within the range of values for M.

In one non-limiting embodiment, be method 700 may further comprise setting a value as a highest value of M from a range of values for M; and at regular or irregular intervals, decrementing the value of M starting from the highest value within the range of values for M. For example, the at least one processor 608 may be configured to set a value as the highest value of M from the range of values for M; and at regular or irregular intervals, decrement the value of M starting from the highest value within the range of values for M.

In one non-limiting embodiment, the method 700 may further comprise setting a value as a lowest value of M from a range of values for M; and at regular intervals, incrementing the value of M starting from the lowest value within the range of values for M. The method 700 may further comprise upon detecting that the value of M has reached a particular value within the range of values for M, decrementing the value of M at regular intervals starting from the particular value. For example, the at least one processor 608 may be configured to set a value as a lowest value of M from a range of values for M; and at regular intervals, increment the value of M starting from the lowest value within the range of values for M. Upon detecting that the value of M has reached a particular value within the range of values for M, the processor 608 may be configured to decrement the value of M at regular intervals starting from the particular value.

In one non-limiting embodiment, the operation of block 704 i.e., updating the RTO period after the successful data transmission based at least on the computed RTT period may comprise computing the RTO period after the successful data transmission using:

$$RTO_n = \frac{[(RTO_{n-1})*(n-1)] + RTT_n}{n}$$

where,
  n is a sequence number of the successful data transmission, $RTO_n$ is the RTO period after the successful data transmission, $RTO_{n-1}$ is an immediate previous RTO period, and $RTT_n$ is the RTT period for the successful data transmission.

In one non-limiting embodiment, the method 700 may further comprise continue updating the RTO period after every $M^{th}$ successful data transmission until the RTO period falls within a defined range, where the defined range is dynamically updated. The at least one processor 608 may be configured to continue updating the RTO period after every $M^{th}$ successful data transmission until the RTO period falls within the defined range. In other words, the at least one processor 608 may be configured to continue updating the RTO period after every $M^{th}$ successful data transmission whenever the RTO period is outside the defined range.

The above method 700 may be described in the general context of computer executable instructions. Generally, computer executable instructions can include routines, programs, objects, components, data structures, procedures, modules, and functions, which perform specific functions or implement specific abstract data types. In one aspect, the method 700 may be performed by an apparatus comprising at least one processor and memory 610. In an aspect, the client 110 may comprise the apparatus for performing the method 700.

The order in which the various operations of the method 700 are described is not intended to be construed as a limitation, and any number of the described method blocks can be combined in any order to implement the method 700. Additionally, individual blocks may be deleted from the method 700 without departing from the spirit and scope of the subject matter described herein.

The various operations of methods described above may be performed by any suitable means capable of performing the corresponding functions. The means may include various hardware and/or software component(s) and/or module(s), including, but not limited to the at least one processor 608 of FIG. 6 and the various units. Generally, where there are operations illustrated in Figures, those operations may have corresponding counterpart means-plus-function components.

It may be noted here that the subject matter of some or all embodiments described with reference to FIGS. 1-6 may be relevant for the method 700 and apparatus and the same is not repeated for the same of brevity.

In a non-limiting embodiment of the present disclosure, one or more non-transitory computer-readable media may be utilized for implementing the embodiments consistent with the present disclosure. A computer-readable medium refers to any type of physical memory (such as the memory 610) on which information or data readable by a processor may be stored. Thus, a computer-readable media may store one or more instructions for execution by the at least one processor 608, including instructions for causing the at least one processor 608 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

As used herein, a phrase referring to "at least one" "one or more" of a list of items refers to any combination of those items, including single members. As an example, "at least one of: A, B, or C" is intended to cover: A, B, C, A-B, A-C, B-C, and A-B-C. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims.

What is claimed is:

1. A method of dynamically updating a retransmission timeout (RTO) period for data transmissions in a communication system, the method comprising:

computing a round-trip time (RTT) period for a successful data transmission between a client and a server in the communication system;

updating the RTO period after the successful data transmission based at least on the computed RTT period;

setting a value as a lowest value of M from a range of values for M;

repeating the computing and updating after every $M^{th}$ successful data transmission, wherein M is an integer with a value greater than 1; and at regular intervals, incrementing the value of M starting from the lowest value within the range of values for M.

2. The method according to claim 1, further comprising: setting a value of M to a fixed value.

3. The method according to claim 1, further comprising: determining a range of values for M based on a current network traffic; and at different intervals, selecting a value of M from the range of values for M.

4. The method according to claim 3, further comprising: updating the range of values for M upon detecting a change in the current network traffic; and at different intervals, selecting a value of M from the updated range of values for M.

5. The method according to claim 1, further comprising: at different intervals, randomly selecting a different value of M from a range of values for M.

6. The method according to claim 1, further comprising: upon detecting that the value of M has reached a particular value within the range of values for M, decrementing the value of M at regular intervals starting from the particular value.

7. The method according to claim 1, wherein updating the RTO period after the successful data transmission based at least on the computed RTT period comprises:

computing the RTO period after the successful data transmission using:

$$RTO_n = \frac{[(RTO_{n-1}) * (n-1)] + RTT_n}{n}$$

where, n is a sequence number of the successful data transmission, $RTO_n$ is the RTO period after the successful data transmission, $RTO_{n-1}$ is an immediate previous RTO period, and $RTT_n$ is the RTT period for the successful data transmission.

8. The method according to claim 1, further comprising:

continue updating the RTO period after every $M^{th}$ successful data transmission until the RTO period falls within a defined range, wherein the defined range is dynamically updated.

9. An apparatus for dynamically updating a retransmission timeout (RTO) period for data transmissions in a communication system, the apparatus comprising:

a memory; and at least one processor communicatively coupled with the memory and configured to:

compute a round-trip time (RTT) period for a successful data transmission between a client and a server in the communication system;

update the RTO period after the successful data transmission based at least on the computed RTT period;

set a value as a lowest value of M from a range of values for M;

repeat the computing and updating after every $M^{th}$ successful data transmission, wherein M is an integer with a value greater than 1; and at regular intervals, increment the value of M starting from the lowest value within the range of values for M.

10. The apparatus according to claim 9, wherein the at least one processor is further configured to:

set a value of M to a fixed value.

11. The apparatus according to claim 9, wherein the at least one processor is further configured to:

determine a range of values for M based on a current network traffic; and at different intervals, select a value of M from the range of values for M.

12. The apparatus according to claim 11, wherein the at least one processor is further configured to:

update the range of values for M upon detecting a change in the current network traffic; and at different intervals, select a value of M from the updated range of values for M.

13. The apparatus according to claim 9, wherein the at least one processor is further configured to:

at different intervals, randomly select a different value of M from a range of values for M.

14. The apparatus according to claim 9, wherein the at least one processor is further configured to:

upon detecting that the value of M has reached a particular value within the range of values for M, decrement the value of M at regular intervals starting from the particular value.

15. The apparatus according to claim 9, wherein to update the RTO period after the successful data transmission based at least on the computed RTT period, the at least one processor is further configured to:

compute the RTO period after the successful data transmission using:

$$RTO_n = \frac{[(RTO_{n-1}) * (n-1)] + RTT_n}{n}$$

where, n is a sequence number of the successful data transmission, $RTO_n$ is the RTO period after the successful data transmission, $RTO_{n-1}$ is an immediate previous RTO period, and $RTT_n$ is the RTT period for the successful data transmission.

16. The apparatus according to claim 9, wherein the at least one processor is further configured to:

continue updating the RTO period after every $M^{th}$ successful data transmission until the RTO period falls within a defined range, wherein the defined range is dynamically updated.

17. A non-transitory computer readable media comprising one or more instructions which, when executed by at least one processor of an apparatus, cause the apparatus to perform the method according to claim 1.

* * * * *